United States Patent

Canaday

[11] Patent Number: 5,088,217
[45] Date of Patent: Feb. 18, 1992

[54] LINE READER APPARATUS

[76] Inventor: Cameron Canaday, 2786 Hidden Arbor Ct. #208, Memphis, Tenn. 38128

[21] Appl. No.: 701,746

[22] Filed: May 17, 1991

[51] Int. Cl.⁵ .................. B41J 11/64; B41J 13/10
[52] U.S. Cl. ............................ 40/356; 40/353; 281/45; 116/240; 248/442.2; 248/280.1
[58] Field of Search ............ 116/240, 235, 234; 40/352, 353, 356; 281/45; 248/442.2, 281.1, 280.1

[56] References Cited

U.S. PATENT DOCUMENTS

| | | | |
|---|---|---|---|
| 1,393,116 | 10/1921 | Guthridge | 40/356 |
| 2,331,149 | 10/1943 | Van Buren | 116/240 X |
| 2,542,460 | 2/1951 | Baukus | 116/240 X |
| 3,099,102 | 7/1963 | Mitsuyasu | 248/442.2 |
| 3,449,850 | 6/1969 | Eckert | 40/356 |
| 3,908,297 | 9/1975 | Schmutzler et al. | 40/352 X |
| 4,433,499 | 2/1984 | Sharber et al. | 40/356 |
| 4,568,052 | 2/1986 | Solomon et al. | 248/281.1 |
| 4,582,285 | 4/1986 | Bello | 248/442.2 |
| 4,760,661 | 8/1988 | Yoshikoshi et al. | 40/356 |
| 4,987,690 | 1/1991 | Aaldenberg et al. | 40/352 X |

FOREIGN PATENT DOCUMENTS

| | | | |
|---|---|---|---|
| 1226615 | 7/1960 | France | 40/356 |
| 0409474 | 10/1966 | Switzerland | 116/235 |

*Primary Examiner*—William A. Cuchlinski, Jr.
*Assistant Examiner*—John L. Beres
*Attorney, Agent, or Firm*—Leon Gilden

[57] ABSTRACT

An apparatus wherein a line reader support housing is mounted to an articulated framework that in turn is securable to a support table. The line reader housing includes a transparent reader bar in operative relationship with a step motor to effect vertical repositioning of the reader bar relative to an underlying sheet member.

5 Claims, 4 Drawing Sheets

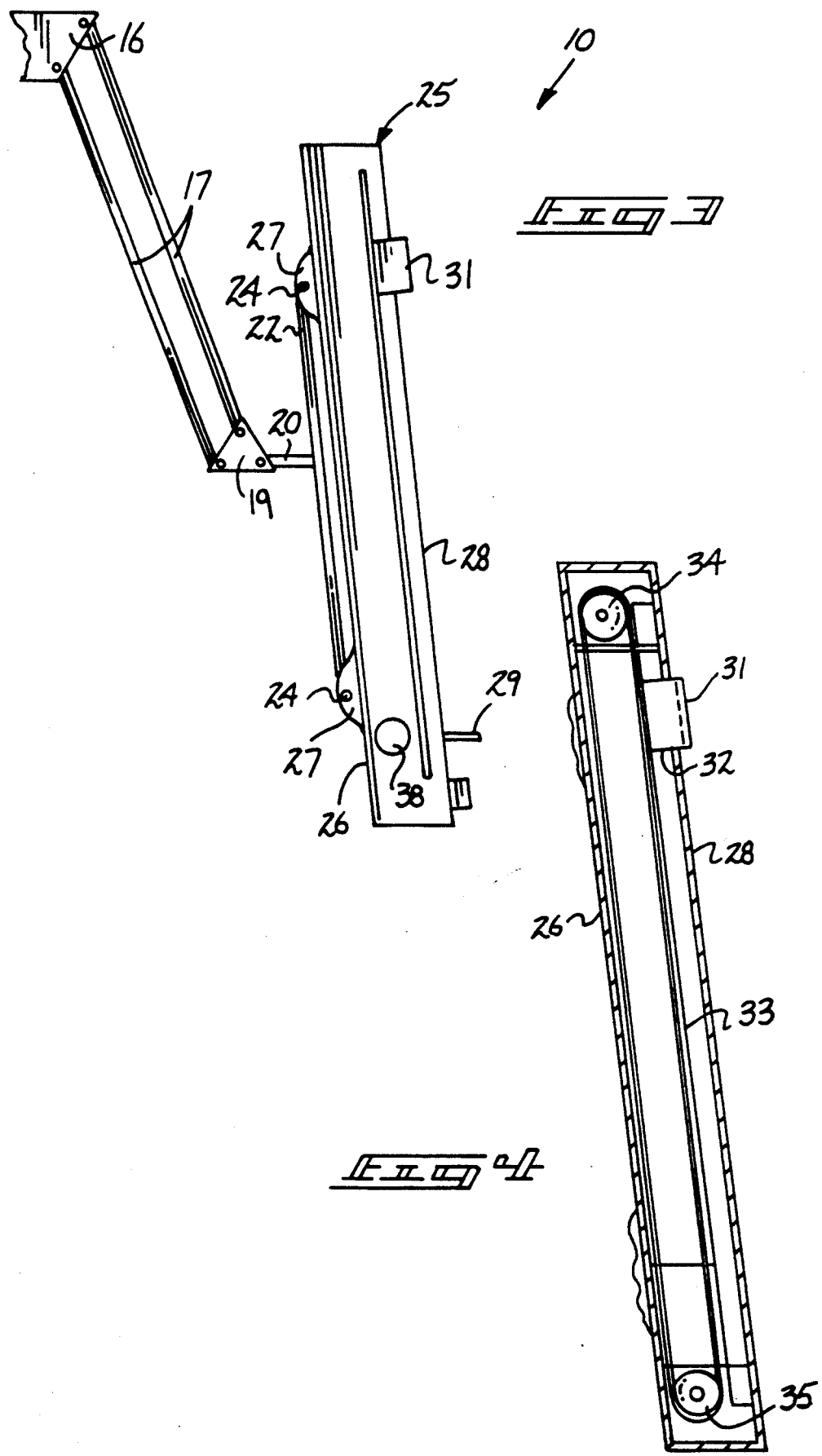

LINE READER APPARATUS

BACKGROUND OF THE INVENTION

1. Field of the Invention

The field of invention relates to reader apparatus, and more particularly pertains to a new and improved line reader apparatus wherein the same is arranged to present a reader line in relationship to an underlying sheet to enhance ease of reading of the underlying sheet during typing procedures and the like.

2. Description of the Prior Art

Readers of various types have been utilized in the prior art to enhance ease of typing and the like when an operator types from a first sheet of paper or manuscript to a further such sheet of paper. Examples of the prior art include Wopschall U.S. Pat. No. 3,760,766 wherein indicating tape is arranged for extrusion from a tape housing for alignment relative to illustrate reading of items at the vertical or horizontal coordination of the underlying support.

Wegner U.S. Pat. No. 3,719,161 sets forth a manually displaceable line reading bar in operative relationship relative to a support book member utilizing magnetic members to mount the reader bar.

Gillum U.S. Pat. No. 4,770,115 sets forth a line guide for use with a copy stand where an underlying guide is manually displaceable in a vertical orientation relative to the apparatus.

As such, it may be appreciated that there continues to be a need for a new and improved line reader apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of reader apparatus now present in the prior art, the present invention provides a line reader apparatus wherein the same is arranged for displacing in a vertical orientation with a reader bar relative to an underlying manuscript. As such, the general purpose of the present invention, which will be described subsequently in greater detail, is to provide a new and improved line reader apparatus which has all the advantages of the prior art reader apparatus and none of the disadvantages.

To attain this, the present invention provides an apparatus wherein a line reader support housing is mounted to an articulated framework that in turn is securable to a support table. The line reader housing includes a transparent reader bar in operative relationship with a step motor to effect vertical repositioning of the reader bar relative to an underlying sheet member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with Patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved line reader apparatus which has all the advantages of the prior art reader apparatus and none of the disadvantages.

It is another object of the present invention to provide a new and improved line reader apparatus which may be easily and efficiently manufactured and marketed.

It is a further object of the present invention to provide a new and improved line reader apparatus which is of a durable and reliable construction.

An even further object of the present invention is to provide a new and improved line reader apparatus which is susceptible of a low cost of manufacture with regard to both materials and labor, and which accordingly is then susceptible of low prices of sale to the consuming public, thereby making such line reader apparatus economically available to the buying public.

Still yet another object of the present invention is to provide a new and improved line reader apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the reader housing mounted to the articulate framework.

FIG. 4 is an orthographic cross-sectional illustration of the reader housing.

DESCRIPTION OF THE PREFERRED EMBODIMENT

Figure 1:
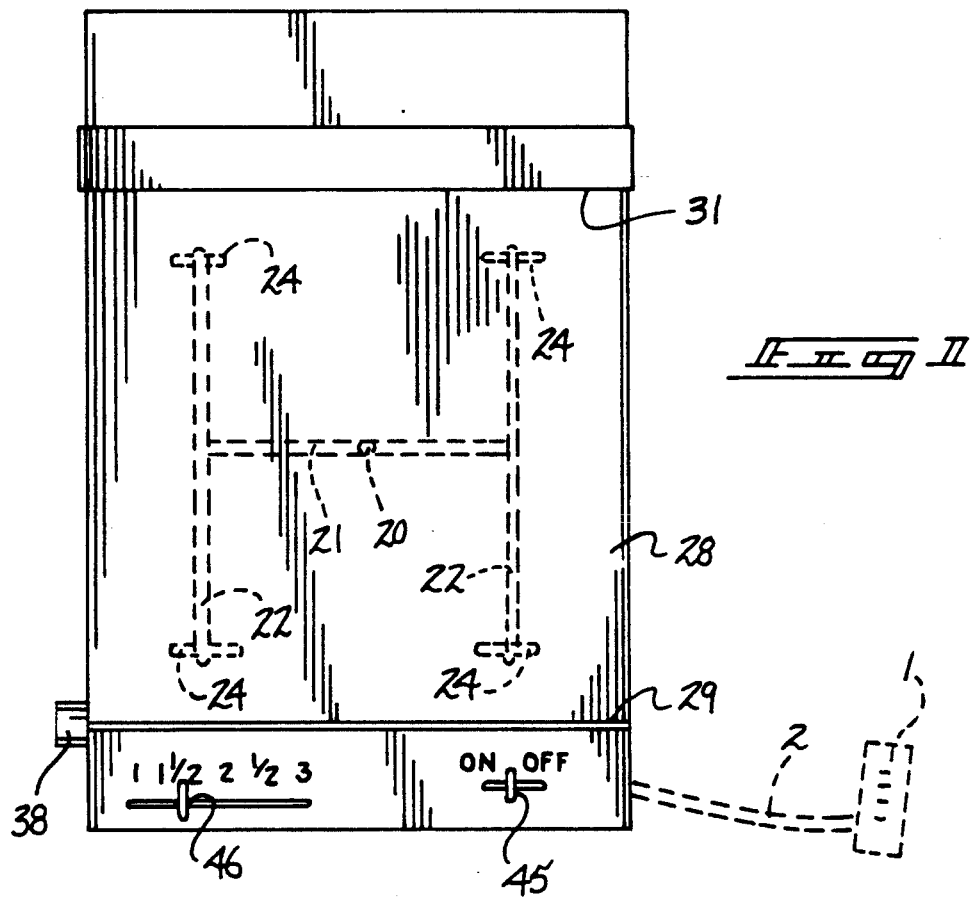
FIG. 1 is an orthographic frontal view, taken in elevation, of the apparatus of the instant invention.
Figure 2:
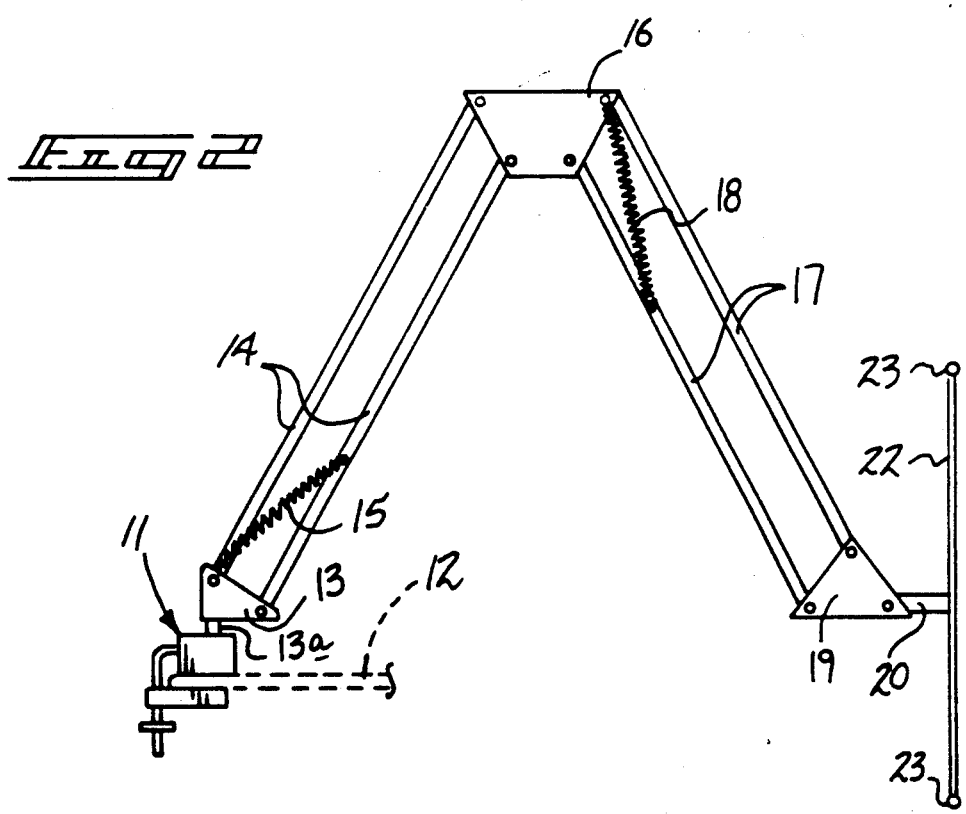
FIG. 2 is an orthographic side view of the articulated framework utilized by the instant invention.
Figure 5:
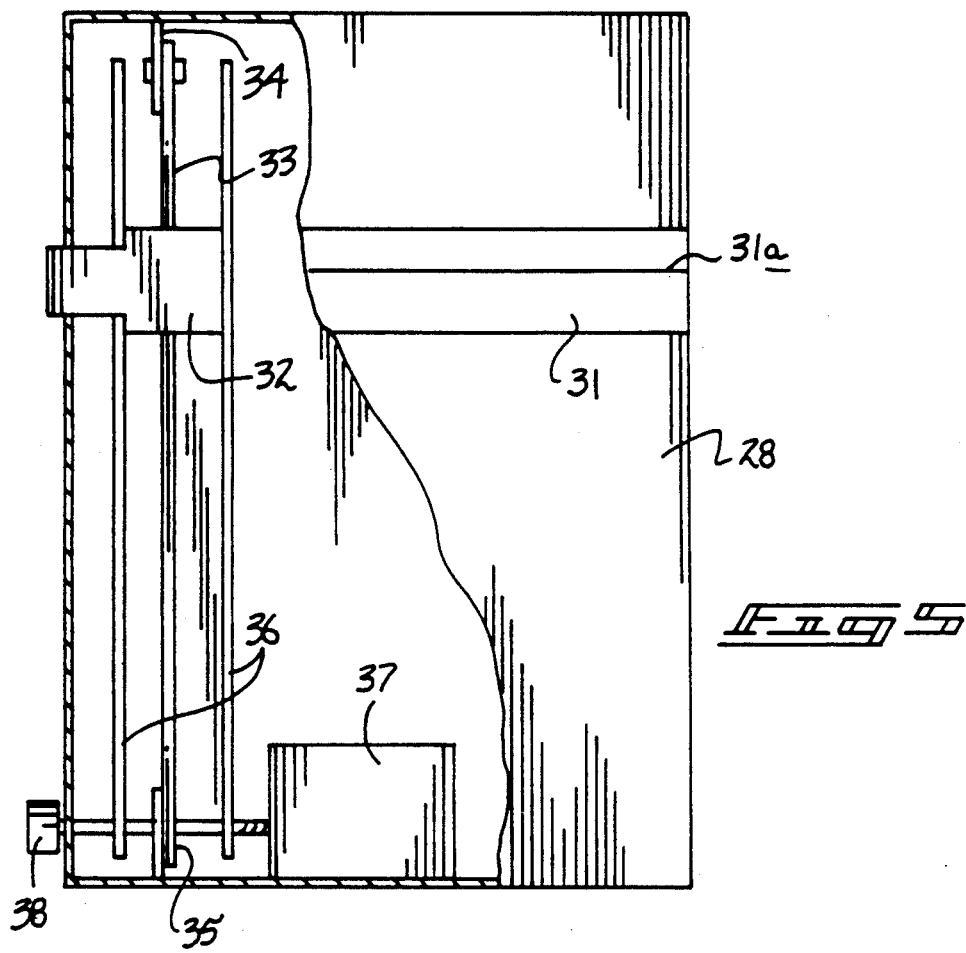
FIG. 5 is a top plan view, partially in section, of the housing structure.
Figure 6:
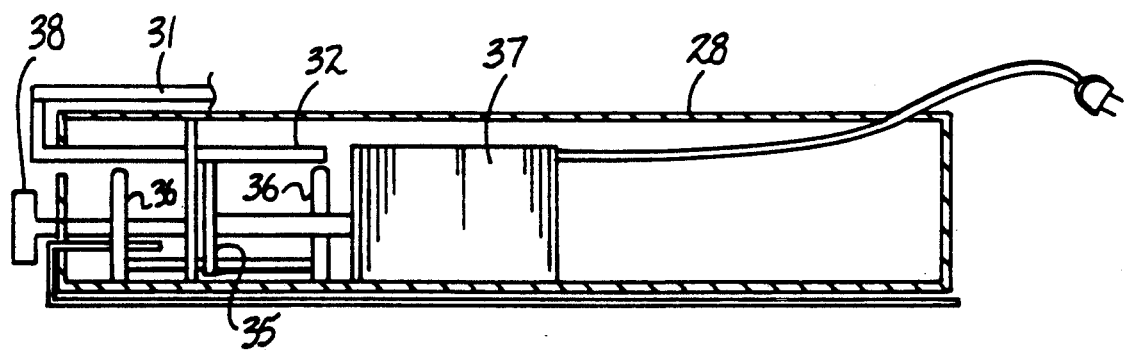
FIG. 6 is an orthographic end cross-sectional illustration of the reader housing.
Figure 7:
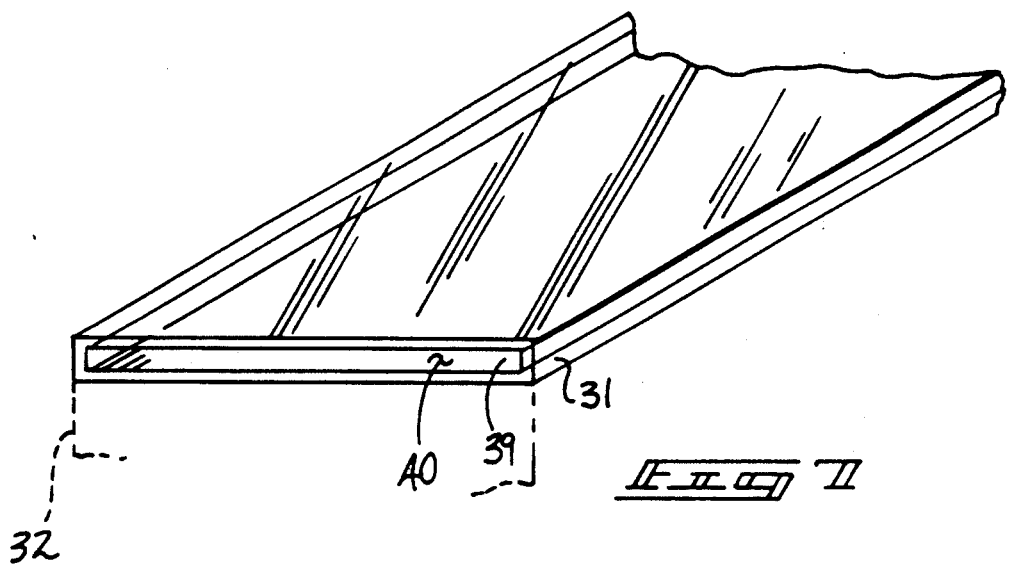
FIG. 7 is an isometric illustration of the transparent reader bar utilized by the instant invention.
Figure 8:
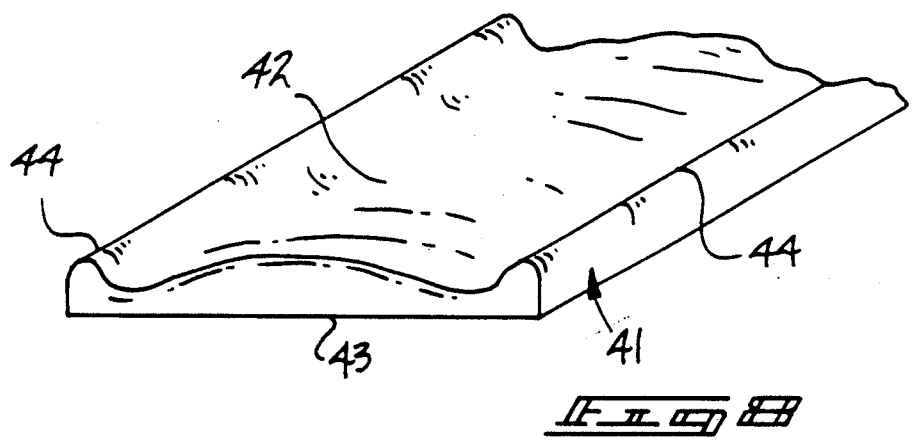
FIG. 8 is an isometric illustration of a magnifier lens utilized by the instant invention.
Figure 9:
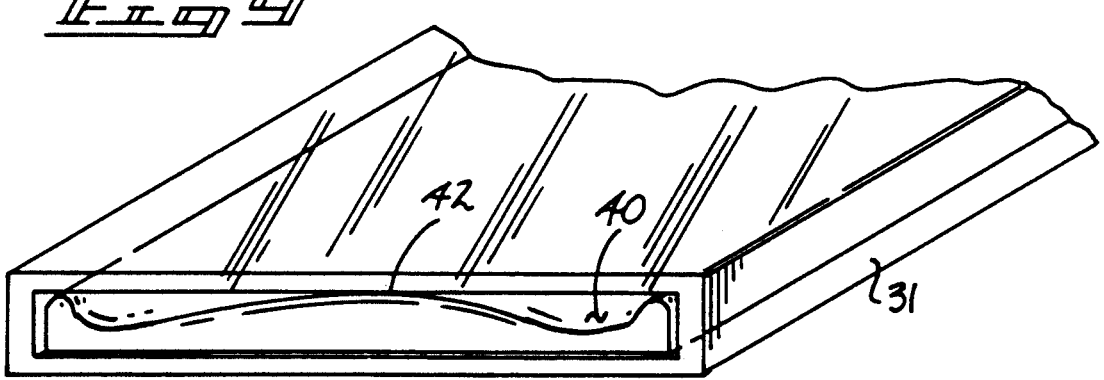
FIG. 9 is an isometric illustration of the magnifier lens mounted within the reader bar.

With reference now to the drawings, and in particular to FIGS. 1 to 9 thereof, a new and improved line reader apparatus embodying the principles and concepts of the present invention and generally designated by the reference numeral 10 will be described.

More specifically, the line reader apparatus 10 of the instant invention essentially comprises a connecting member 11 (see FIG. 2) permitting securement of the connecting member to a support platform 12, such as a table and the like. A first support base 13 is pivotally mounted to the support platform 12 through a pivot axle 13a. First support legs 14 are pivotally mounted in a parallel linked relationship relative to the first support 13 utilizing a first support spring 15 to bias the support legs 14 in a predetermined orientation relative to the first support 13. An intermediate second support 16 includes the first support legs 14 pivotally mounted thereto, and further includes a plurality of second support legs 17 arranged in a parallel pivotal relationship mounted to the second support 16 at an opposed end of the second support 16 from the first support legs 14 entering the intermediate second support 16. A second spring 18 attached to the second support and to one of said second support legs 17 provides biasing of the second legs in a predetermined orientation relative to the second support. Lower terminal ends of the second support legs 17 mount a third support 19 that in turn includes a mounting rod 20. The mounting rod 20 mounts a housing 25. The housing 25 includes a housing rear wall 26. The mounting rod 20 orthogonally and integrally mounts a bridge support leg 21 intermediately of the bridge support leg's length, wherein opposed ends of the bridge support leg 21 orthogonally mounts spaced parallel mounting legs 22. Each of end mounting leg 22 includes a mounting bore 23 to receive a pin 24. The housing rear wall 26 includes a plurality of pairs of mounting ears 27, wherein each pair is longitudinally aligned relative to an opposing ear and receives a pin 24 of each of the mounting bores 23.

The housing 25 further includes a front wall 28 mounting a support plate 29 adjacent its lower terminal end, wherein the support plate 29 is fixedly mounted to the front wall 28 and oriented substantially at an angle defining an oblique angle between the support plate 29 and the housing front wall 28.

A transparent line reader bar 31 is arranged in a parallel relationship extending over the housing front wall 28 directed from one side thereof to an opposed side. A reader bar mounting leg 32 is orthogonally mounted at its upper end to the reader bar 31 and at its lower end defines an "L" shaped configuration for securement to an endless band 33. The endless band 33 is mounted to a pair of pulleys defining an upper pulley 34 and a lower pulley 35. Guide bars 36 position the mounting leg 32 that projects interiorly of the housing in alignment to maintain a proper spacing of the reader bar 31 relative to the front wall 28. A step motor 37 is coaxially mounted to the lower pulley 35 and effects stepped repositioning of the reader bar 31 about the front wall 28. The rotation handle 38 positioned exteriorly of a side wall of the housing 25 is arranged for manual repositioning of the reader bar as the handle 38 is coaxially mounted to an output shaft of the step motor 37 that extends from the step motor 37 through the lower pulley 35 to a coaxial relationship relative to the handle 38 (see FIG. 6).

The reader bar may optionally be formed to define a reader bar rectangular cross-sectional configuration cavity 40 extending throughout the reader bar, with a reader bar entrance opening 39 permitting reception of a magnifier bar 41 therewithin. The magnifier bar 41 is defined by a predetermined length equal to the predetermined length of the reader bar 41. The magnifier bar 41 includes a convex top surface to effect magnification of an underlying paper and the like mounted between the reader bar and the housing front wall 28 (not shown), wherein the magnifier bar 41 includes a planar bottom surface 43, with side bar legs 44 extending coextensively of the magnifier bar 42 arranged in a parallel relationship at opposed upper and lower sides of the magnifier bar 41. The side bar legs 44 are defined a predetermined height substantially equal to a predetermined height between the planar bottom surface 43 and the convex top surface 42. The legs effect stability of positioning of the magnifier bar within the reader bar cavity 40.

Finally, an on/off switch 45 is provided, as well as a step motor control switch 46 to permit selective actuation of the step motor 37 in a vertical orientation relative to an associated manuscript or paper, as noted above. It is understood that the line reader apparatus is utilized with a key pad that attaches to the unit with a cord to permit remote actuation of the line reader and step motor in use. The unit may be adhesively mounted to either side of the key board of an associated typewriter, word processing, or computer key board and the like. The control would be of a conventional manner to operate the step motor in details believed to be available to one of ordinary skill in the art.

It should be further noted that the unit may be utilized as a free-standing organization in lieu of the articulated framework, whereupon a conventional leg may be provided to a rear surface of the unit (not shown) to permit the unit to be utilized in a free-standing manner.

It should be further noted that the organization may be formed to expand to accommodate sheets of greater width for mounting upon the front wall 28. To this end, the organization may include telescoping end wall structure to permit expansion of the housing 25, as well as a telescoping reader bar for the same purpose.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A line reader apparatus comprising,
a clamping member, the clamping member arranged for securement to a support platform, wherein the clamping member includes a first support base, the first support base pivotally mounted to the clamping member, and
a plurality of first support legs pivotally mounted to the first support base at lower terminal ends of the first support legs, and
an intermediate second support base to pivotally receive upper terminal ends of the first support legs, and
the intermediate second support base including a plurality of second support legs pivotally mounted to the intermediate second support base, and
the second support legs pivotally mounted at lower terminal ends of the second support legs to a third support, the third support including a mounting rod fixedly mounted to the third support base, wherein the mounting rod is orthogonally and medially mounted to a bridge support leg, the bridge support leg includes spaced parallel mounting legs, the spaced parallel mounting legs include mounting bores at opposed ends of each mounting leg, and
a reader housing, the reader housing including a housing rear wall, the housing rear wall including plural pairs of mounting ears, each pair of mounting ears mounted to one of said mounting legs, and
mounting pins to mount each of the mounting legs to each pair of mounting ears, and
the housing including a front wall, the front wall including a support plate fixedly mounted to the front wall adjacent the lower terminal end thereof, wherein the support plate defines an oblique angle between the housing front wall and the support plate, and
a transparent line reader bar, wherein the transparent line reader bar is positioned in a spaced relationship relative to the housing front wall above the support plate.

2. An apparatus as set forth in claim 1 wherein the housing includes an interior cavity, wherein the interior cavity of the housing includes a step motor mounted therewithin, the step motor including a step motor output shaft, and a lower pulley coaxially mounted to the step motor output shaft medially of the output shaft, and an upper pulley spaced from the lower pulley, and an endless band wound about the upper pulley and lower pulley, and the transparent line reader bar including a mounting leg, wherein the mounting leg is orthogonally mounted to the transparent line reader bar and defines an "L" shaped configuration, with a portion of the mounting leg directed into the housing and secured to the endless band to permit translation of the reader bar over the front wall upon actuation of the step motor.

3. An apparatus as set forth in claim 2 wherein the step motor extends exteriorly of the housing and includes a manual rotation handle fixedly and coaxially mounted to the step motor output shaft exteriorly of the housing.

4. An apparatus as set forth in claim 3 wherein the transparent reader bar includes a cavity coextensive therethrough of a rectangular cross-sectional configuration, with the reader bar cavity including an entrance opening, and the reader bar cavity including a magnifier bar selectively positionable within the reader bar cavity.

5. An apparatus as set forth in claim 4 wherein the magnifier bar includes a convex top surface and a planar bottom surface spaced apart a predetermined height, and the magnifier further includes side bar legs arranged parallel relative to one another and fixedly mounted to opposed longitudinal sides of the magnifier bar, wherein the side bar legs are defined by the predetermined height and the reader bar cavity is defined by a reader bar cavity height equal to the predetermined height to complementarily receive the magnifier bar within the reader bar cavity.

* * * * *